(No Model.)

A. L. ADAMS.
AUGER BIT.

No. 503,224. Patented Aug. 15, 1893.

WITNESSES:

INVENTOR
A. L. Adams.

BY
ATTORNEY

UNITED STATES PATENT OFFICE.

ABE L. ADAMS, OF BRIDGEPORT, CONNECTICUT.

AUGER-BIT.

SPECIFICATION forming part of Letters Patent No. 503,224, dated August 15, 1893.

Application filed November 16, 1892. Serial No. 452,157. (No model.)

*To all whom it may concern:*

Be it known that I, ABE L. ADAMS, a citizen of the United States, residing at Bridgeport, in the county of Fairfield and State of Connecticut, have invented certain new and useful Improvements in Auger-Bits; and I do hereby declare the following to be a full, clear, and exact description of the invention, such as will enable others skilled in the art to which it appertains to make and use the same.

My invention relates to certain new and useful improvements in auger bits, but especially refers to that class of such devices in which the end of the bit is encompassed by a circular cutting edge.

The object of my invention is to so construct such bit that the grinding thereof may be greatly facilitated, while at the same time the breaking of the encompassing cutting edge does not necessarily render the device useless and beyond repair.

Prior to my invention, devices of this description have always been made with the cutting edges of the bit and the encompassing circular cutting part integral, and it has been impossible to grind the bit proper, the only method of sharpening such bit being to scrape the cutting edges of the same; also, should the encompassing cutting part become nicked or otherwise broken, the bit is thereby ruined because it is beyond repair owing to the fact that such part and the cutting edges of the bit proper are one forging; also, bits have heretofore been provided with rectangular cutting knives around the head, for cutting out the corners of a boring so as to provide a device for boring square holes, but such knives perform no function in the boring of a round hole and have no rotary movement, and cannot possibly be utilized in the manner which characterizes the use of my invention. In my improvement, the circular cutter and the bit proper are detachably secured together so as to revolve in harmony, and the advantages of this construction will be obvious from the following description, reference being had to the accompanying drawings forming a part of this specification, in which—

Figure 1:
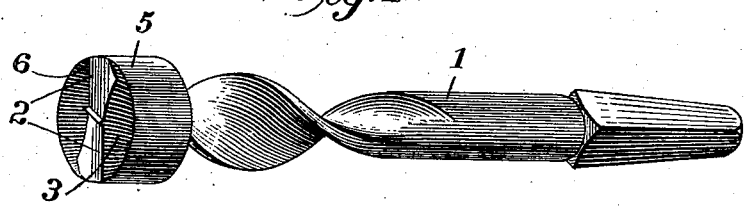
Figure 2:
Figure 3:
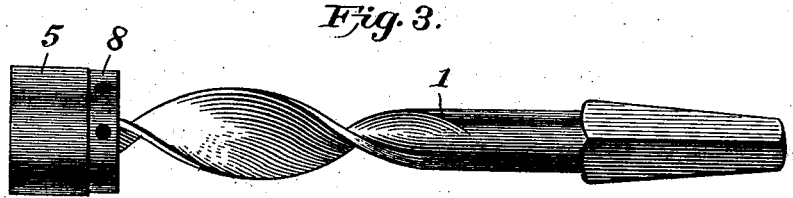

Figure 1 is a perspective of my improved auger bit; Fig. 2, a sectional elevation; Fig. 3, a side elevation of a modification of my improvement, and Fig. 4, a sectional elevation of another modification of my improvement.

Similar numbers denote like parts in the several figures of the drawings.

1 is the shank of the bit and 2 the cutting edges thereof. The head 3 of the bit, on the end of which these cutting surfaces are formed, has a left hand thread 4 cut laterally thereon.

5 is what I term the scoring ring having its front edge flared outwardly as seen at 6 to a cutting edge, the inner circumference of said ring, back of the flared portion being threaded to correspond to the left hand thread 4. The extreme end of the head 3 is beveled inwardly and rearwardly as seen at 7 to conform to the flared portion 6 of the ring 5.

Figure 4:
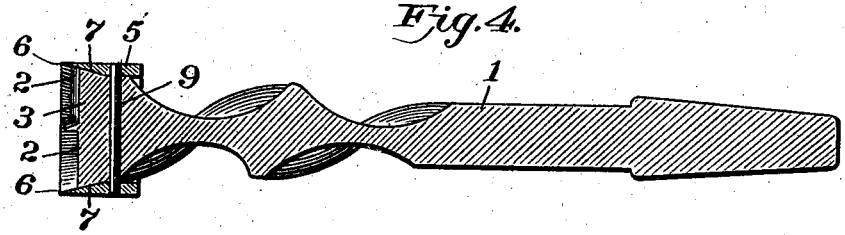

In assembling the two parts of my bit, the ring is placed around the bit from the rear end and screwed to the head until the surfaces 6 and 7 bind together, the normal plane of the cutting edge of the ring being a slight distance beyond the cutting surfaces 2 of the bit. The axial revolution of a bit is from right to left, so that it will be readily understood that the relative positions of the ring and cutters 2 cannot be disturbed by the operation of the bit owing to the binding together of the portions 6, 7. Of course in the instance of a left handed bit, (i. e., a bit whose axial revolution is from left to right) a right handed thread would be employed in securing the ring on the head of the bit. Moreover, it is not absolutely necessary that any particular thread be employed in securing the ring 5, since I can use a jam-nut 8, as shown at Fig. 3, to prevent any backing of the ring during the operation of the bit. The ring may also be secured by means of a pin 9 driven through said ring and bit head, as shown at Fig. 4, it being a simple matter to withdraw said pin to detach the ring, the gist of my invention resting in the broad idea of detachably securing the scoring ring around the head of a bit in such manner that said head and ring will revolve in unison, while the cutting edge of the ring will be a slight distance beyond the cutting surfaces of the bit, whereby said ring by its revolution will make a circular score in advance of the operation of the bit proper. I prefer the construction shown at Figs. 1 and 2, since the wear on the cutting edges of the ring and bit is readily compensated for by the screw adjustment, and also the parts are more easily separated for grinding. Again, should the ring become so worn or nicked as to be worthless, a new ring may be substituted.

Having described my invention, what I claim is—

1. In an auger-bit, the combination with the head, of the scoring-ring detachably secured thereto and having a continuous unbroken circular chisel-edged cutting-edge.

2. In an auger bit, the combination of the head threaded exteriorly, with the scoring-ring interiorly threaded, said head and ring having conforming beveled portions, substantially as set forth.

3. The combination with the bit head with the detachable scoring ring, said head and ring having abutting beveled portions and provided with securing threads which extend in a direction reverse to the axial rotation of the bit, substantially as set forth.

In testimony whereof I affix my signature in presence of two witnesses.

ABE L. ADAMS.

Witnesses:
F. W. SMITH, Jr.,
J. S. FINCH.